No. 821,066. PATENTED MAY 22, 1906.
E. J. SONN.
MANUFACTURING RUBBER NIPPLES AND THE LIKE.
APPLICATION FILED MAY 3, 1905.

Witnesses
Wm. G. Bergman
Alan McDonnell

Inventor
Emanuel J. Sonn
By his Attorney Stephen J. Cox

UNITED STATES PATENT OFFICE.

EMANUEL J. SONN, OF BROOKLYN, NEW YORK.

MANUFACTURING RUBBER NIPPLES AND THE LIKE.

No. 821,066.   Specification of Letters Patent.   Patented May 22, 1906.

Application filed May 3, 1905. Serial No. 258,647.

*To all whom it may concern:*

Be it known that I, EMANUEL J. SONN, a citizen of the United States, and a resident of Brooklyn, in the county of Kings and State of New York, have invented certain new and useful Improvements in Manufacturing Rubber Nipples and the Like, of which the following is a specification.

My invention relates to the manufacture of rubber nipples and the like; and its objects are, among others, to provide for the manufacture of such devices in a quick and inexpensive manner and to provide them with holes or openings of the exact size desired and at the same time to prevent ragged edges at said holes or particles of rubber displaced in forming the same.

To these ends it consists of the process hereinafter described and claimed, and illustrated in the accompanying drawings, forming a part hereof.

Figure 1:
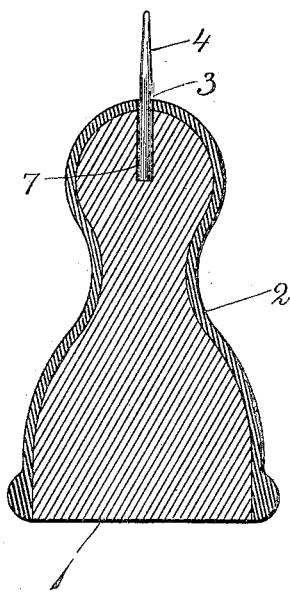
Figure 3:
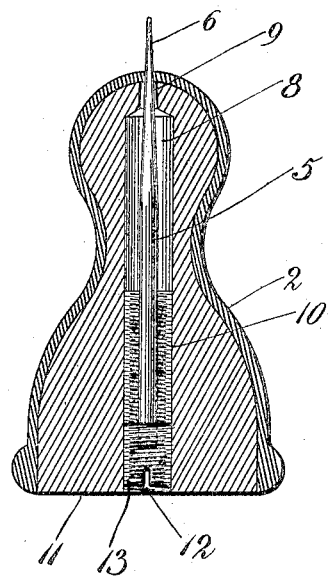
Figure 2:
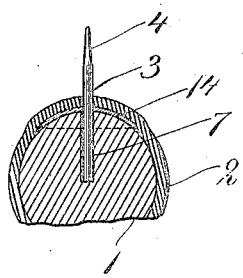

In said drawings, Figure 1 is a vertical medial section of a nipple in the process of manufacture fitted to the form used in connection therewith. Fig. 2 is a detail showing the upper parts of Fig. 1 with a removable flange or collar applied to the pin for forming the opening. Fig. 3 is a like view of a modified construction of form and pin which may be used in my process.

The form 1 may be of any desired shape and is preferably made of lead or other metal having a high degree of heat conductivity. In the upper end of this form is a hole or recess 7, adapted to receive a pin 3, preferably provided with a tapered point 4. In order to prevent the soft rubber from entering between the pin and the upper edge of the recess when pins of smaller diameter are used, I provide a concavo-convex disk, flange, or collar 14, conforming to the upper surface of the form 1 and provided with a central opening through which the pin passes.

In the modified construction shown in Fig. 3 the form or core is provided with a central vertical bore 8, having a contracted opening 9 at its upper end, through which the tapered end 6 of the pin 5 passes and large enough to allow said pin to be moved up and down therethrough. The lower portion of this bore is screw-threaded and adapted to receive the threaded plug 13, to which the lower end of the pin 5 is secured. The threaded portion of the bore is shown at 10 and preferably extends a distance equal to the length of the tapered portion of the pin.

The plug is provided with a slot 12 at its lower end, adapted to receive the blade of a key or screw-driver, and by this means the said plug and pin may be caused to move up and down in the bore of the form 11. It will be seen that in this manner is provided means for enlarging or diminishing the diameter of the hole in the upper end of the nipple. It will also be understood that the disk 14 may be used in connection with the modified construction to prevent the rubber from entering between the pin and the contracted portion of the bore 9.

In manufacturing the nipple the sheet-rubber 2 is applied to the form while in a plastic state and its seams, if any, closed with suitable cement in the ordinary manner. Before applying the rubber to the form, however, the pin 3 is first placed in position. This pin may be fixed in the upper end of the form, and in such case it will be necessary to have forms provided with pins of different diameter when it is desired to vary the size of the opening. In applying the rubber to the form it is closed around the pin or has the pin passed through it, thus leaving an opening of the exact size required. The nipple is then vulcanized and then removed from the form. It will be seen that in this manner the size of the opening may be accurately determined, as the rubber in the process of vulcanizing will become set closely around the pin and when removed therefrom will retain its shape. Where the adjustable pin shown in Fig. 3 is used, the rubber may be formed around or over the small end of the pin and the pin then caused to move upwardly through the rubber to enlarge the said opening to any desired extent. This operation will insure against the presence of any crack or flaw in the nipple at the opening.

In order to understand the advantages obtained by my improved process of manufacture, it is necessary to call attention to the fact that at present the openings of nipples are formed after vulcanizing by means of a punch or drill. As the rubber is at this time in a highly elastic state, it is not possible to secure the accuracy in the size of the opening, which is of great importance in these articles. In addition to this disadvantage rough edges are sometimes left and even particles of rubber about the opening.

What I claim is—

1. A form for vulcanizing rubber nipples and the like, consisting of the form proper, a removable pin secured thereto at one end and projecting from the surface thereof adapted to have its outer free end passed through the rubber.

2. A form for vulcanizing rubber nipples and the like, comprising a form proper, a removable pin secured thereto and projecting from the surface thereof and an annular flange or collar surrounding the said pin and conforming to the adjacent surface of the form.

3. In a form for manufacturing rubber nipples and the like, the combination of a form proper and a pin secured thereto and projecting from the surface thereof tapering toward its outer end.

4. A form for manufacturing rubber nipples and the like, comprising a form proper, a pin secured thereto and projecting from the surface thereof, a tapering portion on said pin, and means for adjusting the said pin longitudinally.

5. In a device of the character described, the combination of a form proper adapted to receive the rubber in plastic condition on its exterior, a pin projecting from the exterior through and beyond the said plastic rubber in such a manner that the latter may be closed around said pin and against the adjacent surface of the form, whereby a capillary opening is formed in the rubber.

6. A device for vulcanizing and forming capillary openings in rubber nipples and the like which consists of a form proper adapted to receive the rubber in plastic condition on its exterior and a pin projecting from the said exterior to an extent greater than the thickness of the rubber in such a manner that the plastic rubber may be closed around said pin and against the adjacent surface of the form and will remain in such position during vulcanizing.

Witness my hand, this 29th day of April, 1905, at the city of New York, in the county and State of New York.

EMANUEL J. SONN.

Witnesses:
HERMAN MEYER,
S. J. COX.